(12) United States Patent
Nagaishi et al.

(10) Patent No.: US 10,214,082 B2
(45) Date of Patent: Feb. 26, 2019

(54) VEHICLE DOOR STRUCTURE

(71) Applicant: Nissan Motor Co., Ltd., Yokohama-shi, Kanagawa (JP)

(72) Inventors: Yusuke Nagaishi, Kanagawa (JP); Yukihiro Hamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/567,994

(22) PCT Filed: May 27, 2015

(86) PCT No.: PCT/JP2015/065262
§ 371 (c)(1),
(2) Date: Oct. 20, 2017

(87) PCT Pub. No.: WO2016/189700
PCT Pub. Date: Dec. 1, 2016

(65) Prior Publication Data
US 2018/0141416 A1 May 24, 2018

(51) Int. Cl.
*B60J 5/04* (2006.01)
(52) U.S. Cl.
CPC ........... *B60J 5/0455* (2013.01); *B60J 5/0427* (2013.01); *B60J 5/0444* (2013.01); *B60J 5/0458* (2013.01)
(58) Field of Classification Search
CPC ...... B60J 5/0458; B60J 5/0444; B60J 5/0455; B60J 5/0427; B60J 5/04
See application file for complete search history.

(56) References Cited

FOREIGN PATENT DOCUMENTS

| | | |
|---|---|---|
| CN | 201235731 Y | 5/2009 |
| CN | 203806014 U | 9/2014 |
| CN | 204139889 U | 2/2015 |
| DE | 102012009415 A1 | 11/2013 |
| DE | 102013009923 A1 | 3/2014 |
| EP | 2040971 A1 | 4/2009 |
| FR | 2418111 A1 | 9/1979 |
| JP | 57-151317 A | 9/1982 |
| JP | 60-107415 A | 6/1985 |
| JP | 2000-71772 A | 3/2000 |
| JP | 2000-71773 A | 3/2000 |
| JP | 2004-82797 A | 3/2004 |
| JP | 2012-111380 A | 6/2012 |
| WO | 2004/067305 A1 | 8/2004 |
| WO | 2005/097528 A1 | 10/2005 |
| WO | 2008/009836 A1 | 1/2008 |
| WO | WO-2016083510 A1 * | 6/2016 ............ B60J 5/0427 |

* cited by examiner

*Primary Examiner* — D Glenn Dayoan
*Assistant Examiner* — Melissa A Black
(74) *Attorney, Agent, or Firm* — Global IP Counselors, LLP

(57) ABSTRACT

A vehicle door structure includes a reinforcing member that is extended along a side sill on an inner door panel side of a lower portion of an outer door panel. The reinforcing member has a first side surface that faces the side sill in the vehicle width direction, and a second side surface that extends from the first side surface to the outer door panel, and the first side surface and the second side surface are joined to the inner door panel.

15 Claims, 3 Drawing Sheets

VEHICLE DOOR STRUCTURE

CROSS-REFERENCE TO RELATED APPLICATIONS

This application is a U.S. National stage application of International Application No. PCT/JP2015/065262, filed May 27, 2015.

BACKGROUND

Field of the Invention

The present invention relates to a vehicle door structure.

Background Information

Japanese Laid-Open Patent Application No. 2000-71772 (Patent Document 1) discloses a vehicle door comprising an outer door panel made of synthetic resin and a door frame made from aluminum alloy that is disposed inside the outer door panel. A frame component as a reinforcing member that extends in the longitudinal direction of the vehicle body is provided on the side sill side of the lower end portion of the door, so that a collision load that is input to the lower end portion of the outer door panel at the time of a side collision is transmitted to the side sill via the frame component.

SUMMARY

However, the reinforcing member described above is only locked to the lower end portion of the door by a locking body that is provided to the outer door panel, and the fixing strength thereof is insufficient; therefore, if a collision load is input to the lower end portion of the outer door panel, there is the risk that the reinforcing member will fall off of the lower end portion of the door. Therefore, in the door structure described above, there is the risk that, during a side collision, the collision load will not be transmitted to the side sill via the reinforcing member, and that the desired collision performance will not be exerted.

An object of the present invention is to provide a door structure that is capable of reliably exerting the desired collision performance.

One embodiment of the present invention is a vehicle door structure comprising a reinforcing member that is extended along a side sill on an inner door panel side of a lower portion of an outer door panel. The reinforcing member has a first side surface that faces the side sill in the vehicle width direction, and a second side surface that extends from the first side surface to the outer door panel side, and the first side surface and the second side surface are joined to the inner door panel.

In the door structure described above, a reinforcing member provided on the inner door panel side of the outer door panel is joined to the inner door panel on the first side surface that faces the side sill in the vehicle width direction. That is, the reinforcing member is fixed to the door in a state of being sandwiched between the inner door panel and the outer door panel. In addition, the reinforcing member is joined to the inner door panel on two surfaces, a first side surface, and a second side surface that extends to the outer door panel side therefrom. In this manner, since the reinforcing member is joined to the inner door panel on two surfaces that are not parallel to each other, that is, two mutually intersecting surfaces, the joint portion is able to exert joining force with respect to collision load from various directions, and the reinforcing member is more firmly fixed to the inner door panel compared with being locked by a locking body. In this manner, according to the door structure described above, the reinforcing member and the door can be more highly integrated; therefore, it is possible to more reliably transmit the collision load that is input to the door at the time of a side collision to the side sill via the reinforcing member and the inner door panel. It is thereby possible to reliably exert the desired collision performance.

BRIEF DESCRIPTION OF THE DRAWINGS

Referring now to the drawings, a vehicle door structure is illustrated.

DETAILED DESCRIPTION OF THE EMBODIMENTS

A vehicle door structure according to an embodiment of the present invention will be described below, with reference to the drawings.

Figure 1:
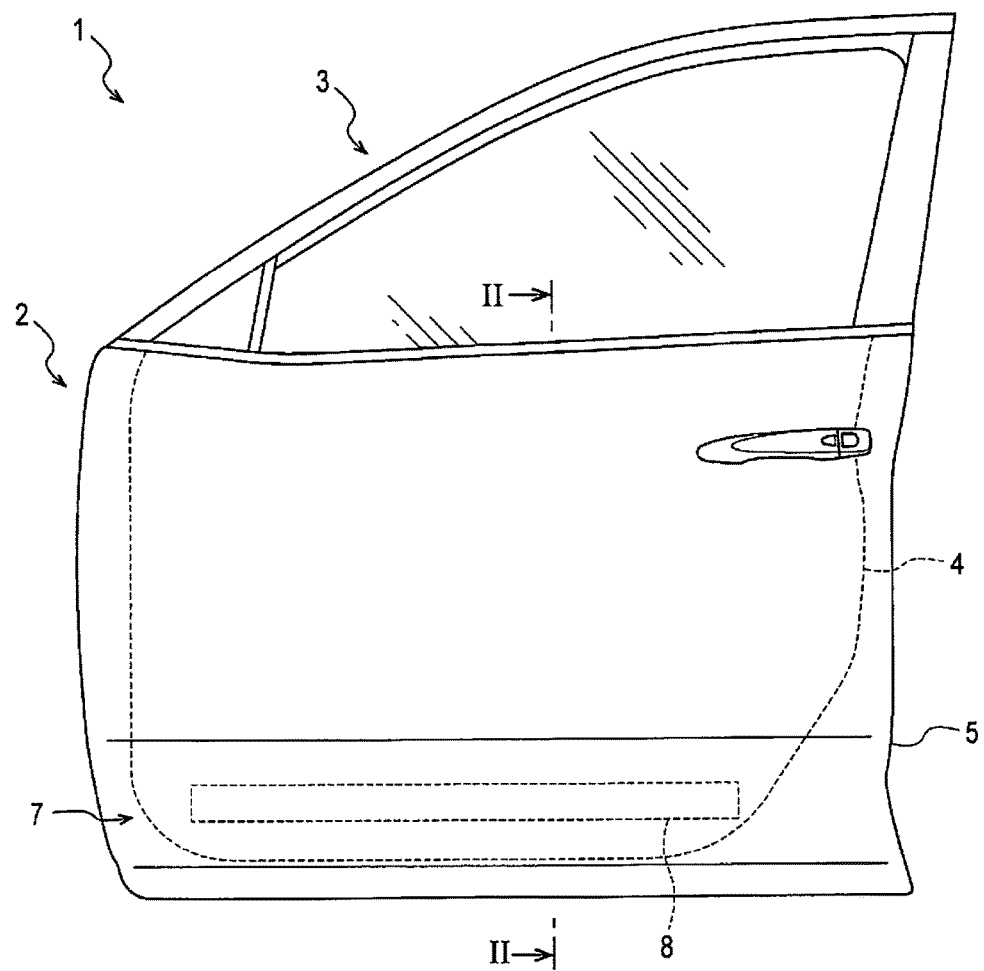
FIG. 1 is an outside view of a door comprising the vehicle door structure according to an embodiment of the present invention.
Figure 2:
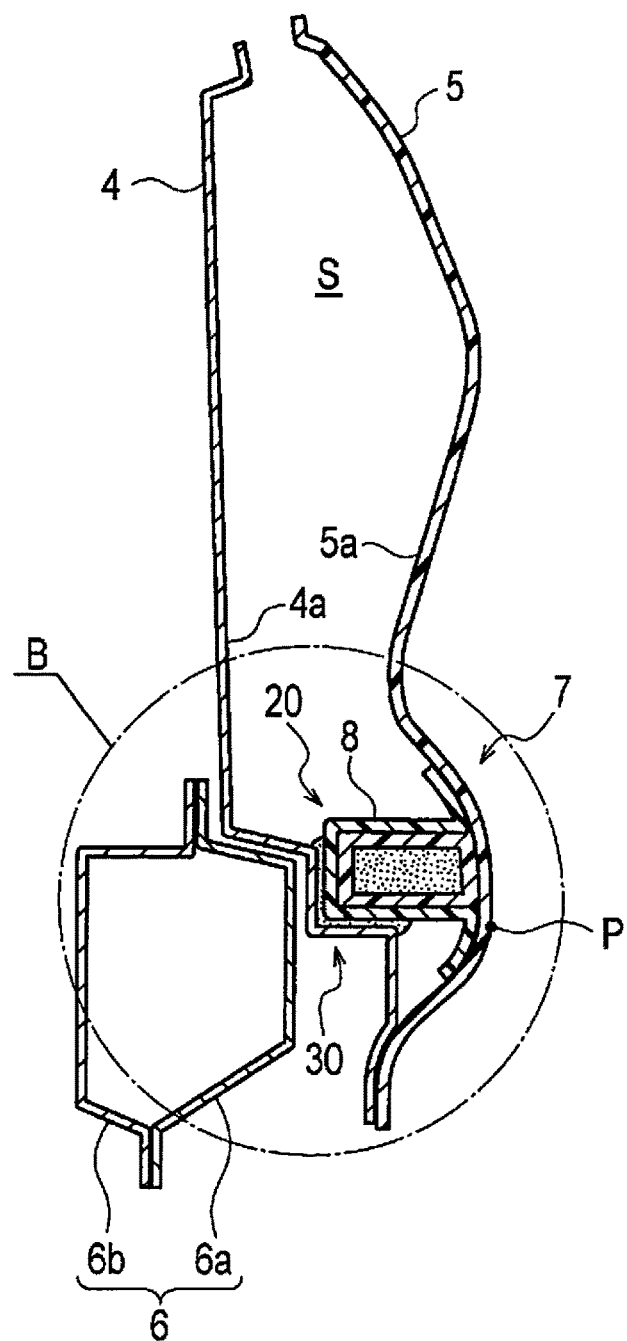
FIG. 2 is a cross-sectional view of a portion of the vehicle door structure as seen along section line II-II of FIG. 1.
Figure 3:
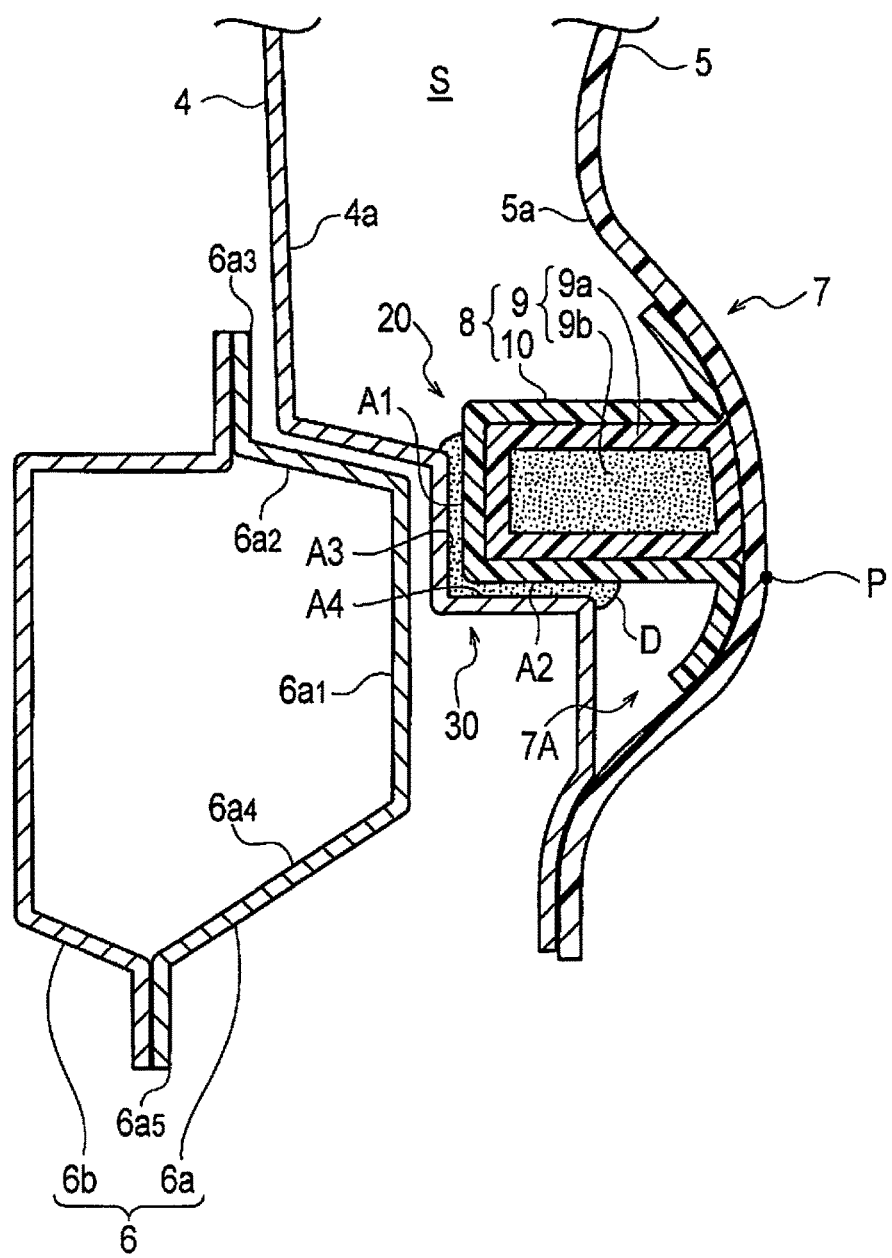
FIG. 3 is an enlarged view of a B portion of the vehicle door structure illustrated in FIG. 2.

The door 1 according to the present embodiment comprises a door main body 2 and a door sash 3, as illustrated in FIG. 1. The door main body 2 is configured from an inner door panel 4 made from a steel plate, and an outer door panel 5 made of fiber-reinforced resin, which constitutes the outer surface of the door main body 2, as illustrated in FIG. 1 to FIG. 3. A side sill 6, which is a vehicle body frame member, extends in the longitudinal direction of the vehicle body, on the vehicle-widthwise inner side of the lower end portion of the door main body 2. The side sill 6 is configured by joining a sill inner portion 6b and a sill outer portion 6a having hat-shaped cross sections.

The outer door panel 5 is configured from fiber-reinforced resin obtained by laminating a plurality of fiber-reinforced resin sheets, and pressurizing and curing same. The fiber-reinforced resin is obtained by, for example, laminating prepreg sheets, in which continuous carbon fibers aligned in one direction are impregnated with thermosetting resin, such that the reinforcing fibers of each layer intersect each other equiangularly, and is then molded via the application of heat and pressure, and is quasi-isotropic. The number of layers of the fiber-reinforced resin sheets is not particularly limited, but may be set to, for example, 4-8 plies (thickness of 1.32-2.64 mm) in the case of a door for an automobile. The basis weight of each sheet is preferably 50-800 g/m$^2$, more preferably 100-600 g/m$^2$, and even more preferably 150-400 g/m$^2$.

The lower portion of the outer door panel 5 constitutes a convex portion 7 that is curved so as to protrude outwardly in the vehicle width direction in a cross section that is perpendicular to the longitudinal direction of the vehicle body. The convex portion 7 extends in the longitudinal direction of the vehicle body essentially across the entire length of the outer door panel 5 in the longitudinal direction of the vehicle body, and is disposed such that the vertical position of the outermost portion P positioned at the outermost position in the vehicle width direction of the convex portion 7 overlaps the vertical position of the side sill 6.

A reinforcing member 8 is provided on the side surface 5a of the convex portion 7 on the inner door panel 4 side. The reinforcing member 8 is disposed inside a concave portion 7A that is formed on the rear surface of the convex portion 7 of the outer door panel 5, and extends along the side sill 6 in the longitudinal direction of the vehicle body.

The reinforcing member 8 is configured from a frame member 9 in which a cylindrical body 9a made of the fiber-reinforced resin and having an annular rectangular cross section is filled with a foam core material 9b made of foamed polyethylene, and a fixing member 10 for fixing the frame member 9 to the outer door panel 5. The fixing member 10 is a member made of the fiber-reinforced resin and having an essentially hat-shaped cross section, and is integrally formed with the outer door panel 5 in a state in which the frame member 9 is sandwiched between the fixing member 10 and the outer door panel 5.

In addition, the reinforcing member 8 is positioned in the vicinity of the lowermost portion of a door interior space S formed between the inner door panel 4 and the outer door panel 5, and extends essentially across the entire length of the door interior space S in the longitudinal direction of the vehicle body. In the door interior space S, the reinforcing member 8 constitutes a ridge portion 20 that protrudes inwardly in the vehicle width direction from a side surface 5a on the vehicle-widthwise inner side of the outer door panel 5. The ridge portion 20 comprises a vehicle-widthwise inner side surface that extends essentially in the vertical direction (hereinafter referred to as a first side surface A1), and a lower surface that extends essentially horizontally from the lower edge of the first side surface A1 toward the outer door panel 5 (hereinafter referred to as a second side surface A2), in a cross section perpendicular to the longitudinal direction of the vehicle body. The first and the second side surfaces A1, A2 each extend continuously in the longitudinal direction of the vehicle body.

On the other hand, a recessed portion 30 having an L-shaped cross section that can receive the ridge portion 20 is provided on the side surface 4a of the lower portion of the inner door panel 4 on the side of the outer door panel 5. In a cross section perpendicular to the longitudinal direction of the vehicle body, the recessed portion 30 faces the first side surface A1, and comprises a vehicle-widthwise outer side surface that extends essentially in the vertical direction (hereinafter referred to as third side surface A3), and a flange upper surface that extends essentially horizontally from the lower edge of the third side surface A3 toward the outer door panel 5 (hereinafter referred to as fourth side surface A4). The third and the fourth side surfaces A3, A4 each extend continuously in the longitudinal direction of the vehicle body.

The first and the third side surfaces A1, A3 face the side sill 6 in the vehicle width direction. More specifically, the sill outer portion 6a comprises a vertical wall $6a_1$ that extends essentially in the vertical direction on the vehicle-widthwise outer side, an upper side wall $6a_2$ that extends inwardly in the vehicle width direction from the upper edge of the vertical wall $6a_1$, an upper flange $6a_3$ that extends upwardly from the vehicle-widthwise inner side edge of the upper side wall 6a2 and that is joined to an upper flange of the sill inner portion 6b, a lower side wall $6a_4$ that extends inwardly in the vehicle width direction from the lower edge of the vertical wall $6a_1$, and a lower flange $6a_5$ that extends downwards from the vehicle-widthwise inner side edge of the lower side wall $6a_4$ and that is joined to a lower flange of the sill inner portion 6b, and the first and the third side surfaces A1, A3 are positioned essentially parallel to the upper portion of the vertical wall $6a_1$ and close to each other in the vehicle width direction.

Then, the first side surface A1 and the second side surface A2 of the reinforcing member 8 (that is, of the ridge portion 20) are respectively surface-bonded to the third side surface A3 and the fourth side surface A4 of the recessed portion 30 of the inner door panel 4 with an adhesive D. The bonding surface of the first side surface A1 and the third side surface A3, and the bonding surface of the second side surface A2 and the fourth side surface A4 each extend continuously in the longitudinal direction of the vehicle body. The thickness of the adhesive D is not particularly limited, but is preferably set to 0.01 mm or more and 3.0 mm or less. Well-known structural adhesives, such as epoxy type or urethane type adhesives, may be used as the adhesive D.

The action and effects of the present embodiment will be described below.

According to the door structure of the present embodiment, the reinforcing member 8 provided on the inner door panel 4 side of the outer door panel 5 is joined to the inner door panel 4 on the first side surface A1 that faces the side sill 6 in the vehicle width direction. That is, the reinforcing member 8 is fixed to the door 1 in a state of being sandwiched between the inner door panel 4 and the outer door panel 5. In addition, the reinforcing member 8 is joined to the inner door panel 4 on two surfaces, the first side surface A1, and the second side surface A2 that extends to the outer door panel 5 from the first side surface A1. In this manner, since the reinforcing member is joined to the inner door panel on two surfaces that are not parallel to each other, that is, two mutually intersecting surfaces, the joint portion is able to exert joining force with respect to collision load from various directions, and the reinforcing member is more firmly fixed to the inner door panel 4 compared with being locked by a locking body. In this manner, according to the door structure described above, the reinforcing member 8 and the door 1 can be more highly integrated; therefore, it is possible to more reliably transmit collision load that is input to the door 1 at the time of a side collision to the side sill 6 via the reinforcing member 8 and the inner door panel 4. The vehicle body and the door 1 comprising the door structure can thereby reliably, and stably exert the required collision performance.

Additionally, since the reinforcing member 8 is integrally formed with the outer door panel 5 in the present embodiment, the reinforcing member 8 is less likely to come off of the outer door panel 5, compared to when the reinforcing member 8 as attached to the outer door panel 5 using an attaching member, or the like. Thus, it is possible to more reliably transmit the collision load to the side sill 6 via the reinforcing member 8 and the inner door panel 4.

In addition, since the first side surface A1 and the second side surface A2 are joined to the inner door panel 4 by the adhesive D in the present embodiment, it is possible to obtain uniform bonding surfaces that are continuous across the entire surface of the first and second side surfaces A1, A2. It is thereby possible to join the reinforcing member 8 to the outer door panel 5 more firmly.

Additionally, since the reinforcing member 8 is disposed in a convex portion 7 that protrudes outwardly in the vehicle width direction in the present embodiment, the collision load at the time of a side collision is more easily input to the reinforcing member 8 via the convex portion 7. Thus, it becomes easier to limit the load transmission path of the collision load to a path that leads to the side sill 6 via the reinforcing member 8 and the inner door panel 4, and it becomes possible to transmit the collision load to the side sill 6 more accurately. In addition, by providing a convex portion 7 to the lower portion of the outer door panel 5, it is possible to improve the design by imparting an attractive pattern to the shape of the outer door panel 5.

Furthermore, in the present embodiment, the convex portion 7 is disposed such that the vertical position of the outermost portion P thereof overlaps the side sill 6. That is, the outermost portion P of the convex portion 7 to which a collision load tends to be input first at the time of a side collision overlaps the side sill 6 at the vertical position. Thus, since the vertical position of the load transmission path from the convex portion 7 to the side sill 6 via the reinforcing member 8 and the inner door panel 4 is aligned, it is possible to more directly transmit the collision load that is input to the convex portion 7 to the side sill 6.

An embodiment of the present invention was described above only in order to facilitate an understanding of the present invention, and the present invention is not limited to said above-described embodiment. The technical scope of the present invention is not limited to the specific technical matter disclosed in the above-described embodiment, but includes various modifications, changes, and alternative techniques that can be easily derived therefrom.

For example, in the embodiment described above, the first side surface A1 and the second side surface A2 of the reinforcing member 8 that are surface-bonded to the inner door panel 4 are disposed in an essentially perpendicular positional relationship with each other in a cross section that is perpendicular to the longitudinal direction of the vehicle body, but the positional relationship between the first side surface A1 and the second side surface A2 is not limited thereto. For example, the angle formed between the first side surface A1 and the second side surface A2 may be greater or less than a right angle. The side surfaces may be parallel to each other as long as the surfaces are not positioned on the same plane.

In addition, in the present embodiment, the bonding surface of the first side surface A1 and the third side surface A3, and the bonding surface of the second side surface A2 and the fourth side surface A4, each extend continuously in the longitudinal direction of the vehicle body; however, the bonding surfaces may be disposed intermittently in the longitudinal direction of the vehicle body, or disposed in a staggered pattern.

Furthermore, in the present embodiment, an example was shown in which a prepreg sheet, in which thermosetting resin is impregnated into carbon fibers, is used as the material for the outer door panel 5 made of fiber-reinforced thermosetting resin, the fixing member 10 of the reinforcing member 8, and the cylindrical body 9a of the frame member 9; however, the material for the above-described members is not limited thereto. Besides carbon fiber, other types of reinforcing fibers can be used, examples of which include glass fiber, polyamide fiber, alumina fiber, silicon carbide fiber, boron fiber, and carborundum fiber. In addition, for example, polyacrylonitrile (PAN type), pitch type, cellulose type, vapor grown carbon fiber by hydrocarbon, graphite fiber, and the like may be used as the carbon fiber. Two or more types of these fibers may be used in combination as well. Also, besides continuous reinforcing fibers, the reinforcing fiber may be in the form of discontinuous reinforcing fibers, long fibers, short fibers, or a combination thereof, or reinforcing fibers of a woven fabric. Well-known thermosetting resin and thermoplastic resin may be used as the matrix resin. Specific examples include epoxy resin, phenol resin, unsaturated polyester resin, vinyl ester resin, polycarbonate resin, polyester resin, polyamide (PA) resin, polypropylene (PP) resin, liquid crystal polymer resin, polyethersulfone resin, polyetheretherketone resin, polyarylate resin, polyphenylene ether resin, polyphenylene sulfide (PPS) resin, polyacetal resin, polysulfone resin, polyimide resin, polyetherimide resin, polyolefin resin, polystyrene resin, modified polystyrene resin, AS resin (copolymer of acrylonitrile and styrene), ABS resin (copolymer of acrylonitrile, butadiene and styrene), modified ABS resin, MBS resin (copolymer of methyl methacrylate, butadiene and styrene), modified MBS resin, polymethyl methacrylate (PMMA) resin, modified polymethyl methacrylate resin, and the like.

Additionally, while the outer door panel 5 of the above-described embodiment is made of fiber-reinforced resin, all or part of the outer door panel 5 may be configured from resin which does not include reinforcing fiber (for example ABS resin, PC/ABC resin, PP resin, PA resin, or the like). The same applies to the fixing member 10 of the reinforcing member 8 and the cylindrical body 9a of the frame member 9.

Furthermore, while the inner door panel 4 is made of a steel plate in the embodiment described above, the material of the inner door panel 4 may be other metals, such as an aluminum alloy, a fiber-reinforced resin, or a resin that does not contain reinforcing fiber.

The method of molding the outer door panel 5 is not particularly limited, and well-known molding methods such as the hot press molding method and the autoclave molding method may be used. Alternatively, the outer door panel may be molded using a method in which a fiber preform as a base material is sealed in a metal mold and a matrix resin is injected under pressure into the metal mold (resin transfer molding method). As long as the outer door panel 5 is made of resin or fiber-reinforced resin reinforced with discontinuous fibers (short fibers, long fibers), the outer door panel may be molded using the injection molding method, or the like. The same applies to the fixing member 10 of the reinforcing member 8 and the cylindrical body 9a of the frame member 9.

Additionally, in the above-described embodiment, a frame member 9 of the reinforcing member 8 to be employed is obtained by filling the cylindrical body 9a made of carbon fiber-reinforced resin material with foam core material 9b; however, the frame member 9 is not particularly limited and may, for example, be a metal hollow tube not comprising a core material, or be made of only foam core material 9b without comprising a cylindrical body.

Furthermore, in the above-described embodiment, foamed polyethylene was employed as the material of the foam core material 9b, but the material of the foam core material 9b is not limited thereto. Examples of other materials include polyurethane (PU), polystyrene (PS), polypropylene (PP), ethylene propylene diene rubber (EPDM), acrylic, polyimide (PI), polyvinyl chloride (PVC), phenol (PF), silicone (SI), polyethylene terephthalate (PET), ethylene-vinyl acetate copolymer (EVA), and the like. Also, the foam core material 9b may contain a fiber reinforcing material, such as nonwoven fabric.

The present invention can be applied to a vehicle door having an outer door panel made of resin or fiber-reinforced resin.

The invention claimed is:
1. A vehicle door structure comprising:
an inner door panel;
an outer door panel made of resin or fiber-reinforced resin; and a reinforcing member extending along a side sill on an inner door panel side of a lower portion of an outer door panel, the reinforcing member having a first side surface that faces the side sill in a vehicle width direction, the first side surface extends substantially parallel to a surface of the inner door panel, and a second side surface that extends from the first side surface to the outer door panel, and the first side surface and the second side surface being joined to the inner door panel.

2. The vehicle door structure according to claim 1, wherein
the reinforcing member is integrally formed with the outer door panel.

3. The vehicle door structure according to claim 1, wherein
the first side surface and the second side surface are joined to the inner door panel by an adhesive.

4. The vehicle door structure according to claim 1, wherein
the lower portion of the outer door panel constitutes a convex portion that protrudes outwardly in the vehicle width direction, and
the reinforcing member is disposed in the convex portion.

5. The vehicle door structure according to claim 4, wherein
the convex portion is disposed such that a vertical position of an outermost portion positioned at the outermost position in the vehicle width direction of the convex portion overlaps the side sill.

6. The vehicle door structure according to claim 2, wherein
the first side surface and the second side surface are joined to the inner door panel by an adhesive.

7. The vehicle door structure according to claim 2, wherein
the lower portion of the outer door panel constitutes a convex portion that protrudes outwardly in the vehicle width direction, and
the reinforcing member is disposed in the convex portion.

8. The vehicle door structure according to claim 7, wherein
the convex portion is disposed such that a vertical position of an outermost portion positioned at the outermost position in the vehicle width direction of the convex portion overlaps the side sill.

9. The vehicle door structure according to claim 3, wherein
the lower portion of the outer door panel constitutes a convex portion that protrudes outwardly in the vehicle width direction, and
the reinforcing member is disposed in the convex portion.

10. The vehicle door structure according to claim 9, wherein
the convex portion is disposed such that a vertical position of an outermost portion positioned at the outermost position in the vehicle width direction of the convex portion overlaps the side sill.

11. The vehicle door structure according to claim 1, wherein
the first surface is an only surface of the reinforcing member that faces the side sill.

12. The vehicle door structure according to claim 1, wherein
the reinforcing member is filled with a foam core material.

13. The vehicle door structure according to claim 12, wherein
the reinforcing member includes a tubular body made of the fiber-reinforced resin, the tubular body being filled with the foam core material.

14. The vehicle door structure according to claim 13, wherein
the tubular body includes an annular rectangular cross section.

15. The vehicle door structure according to claim 12, wherein
the foam core material is foamed polyethylene.

* * * * *